(12) United States Patent
Hu et al.

(10) Patent No.: US 8,797,662 B2
(45) Date of Patent: Aug. 5, 2014

(54) APPARATUSES AND DEVICES FOR ABSORBING ELECTROMAGNETIC RADIATION, AND METHODS OF FORMING THE APPARATUSES AND DEVICES

(75) Inventors: Yongjun Jeff Hu, Boise, ID (US); Allen McTeer, Eagle, ID (US); Lijing Gou, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 327 days.

(21) Appl. No.: 12/967,733

(22) Filed: Dec. 14, 2010

(65) Prior Publication Data

US 2012/0154919 A1 Jun. 21, 2012

(51) Int. Cl.
G02B 5/22 (2006.01)
G02B 5/20 (2006.01)
B82Y 20/00 (2011.01)

(52) U.S. Cl.
CPC ............... *G02B 5/201* (2013.01); *B82Y 20/00* (2013.01); *Y10S 977/707* (2013.01); *Y10S 977/762* (2013.01); *Y10S 977/773* (2013.01); *Y10S 977/834* (2013.01); *Y10S 977/954* (2013.01)
USPC ........... 359/885; 977/707; 977/762; 977/773; 977/834; 977/954

(58) Field of Classification Search
USPC .............. 359/614, 238, 885, 891; 216/2; 425/385; 977/731, 954, 701, 707, 977/720–723, 742–752, 759–772, 810, 831, 977/832, 834, 932, 949, 950, 953, 963
See application file for complete search history.

(56) References Cited

U.S. PATENT DOCUMENTS 6,538,195 B1 3/2003 Shi et al.
7,132,994 B2 11/2006 Crowley
(Continued)

FOREIGN PATENT DOCUMENTS

WO 2009124970 A2 10/2009
WO 2010087785 A1 8/2010

OTHER PUBLICATIONS

Ingram, A. L., Lousse V., Parker A. R., and Vigneron J. P., "Dual gratings interspersed on a single butterfly scale", Jul. 29, 2008, Journal of the Royal Society Interface, vol. 5, pp. 1387-1390.*

(Continued)

*Primary Examiner* — Alicia M Harrington
*Assistant Examiner* — Cara Rakowski
(74) *Attorney, Agent, or Firm* — TraskBritt

(57) ABSTRACT

Photonic nanostructures, light absorbing apparatuses, and devices are provided. The photonic nanostructures include a plurality of photonic nanobars configured to collectively absorb light over an excitation wavelength range. At least two of the photonic nanobars of the plurality have lengths that are different from one another. Each photonic nanobar of the plurality has a substantially small width and a substantially small height relative to the different lengths. A method for forming such may comprise forming a plurality of first photonic nanobars comprising a width and a height that are smaller than a length of the plurality of first photonic nanobars, and forming a plurality of second photonic nanobars comprising a width and a height that are smaller than a length of the second photonic nanobar, wherein the lengths of the plurality of first photonic nanobars and the lengths of the plurality of second photonic nanobars are different from one another.

35 Claims, 10 Drawing Sheets

(56) References Cited

U.S. PATENT DOCUMENTS

| | | | |
|---|---|---|---|
| 7,153,720 B2* | 12/2006 | Augusto | 438/69 |
| 7,482,532 B2 | 1/2009 | Yi et al. | |
| 7,742,322 B2 | 6/2010 | Sargent et al. | |
| 7,773,404 B2 | 8/2010 | Sargent et al. | |
| 8,416,406 B2 | 4/2013 | Stuke et al. | |
| 2003/0157733 A1* | 8/2003 | Polanyi et al. | 438/1 |
| 2007/0289623 A1 | 12/2007 | Atwater | |
| 2009/0097798 A1* | 4/2009 | Williams et al. | 385/37 |
| 2010/0006144 A1 | 1/2010 | Baumberg et al. | |
| 2010/0044676 A1 | 2/2010 | Sargent et al. | |
| 2010/0078055 A1 | 4/2010 | Vidu et al. | |
| 2010/0126567 A1 | 5/2010 | Kaufmann | |
| 2010/0163841 A1 | 7/2010 | Chen et al. | |
| 2010/0180928 A1 | 7/2010 | Raymond et al. | |
| 2010/0188959 A1 | 7/2010 | Kim et al. | |
| 2010/0206380 A1 | 8/2010 | Lindquist et al. | |
| 2010/0236620 A1 | 9/2010 | Nakanishi et al. | |
| 2011/0085229 A1* | 4/2011 | Lavrentovich et al. | 359/315 |
| 2011/0194106 A1* | 8/2011 | Murakami et al. | 356/301 |

OTHER PUBLICATIONS

Lee, R. Todd, and Smith, Glenn S., "Detailed electromagnetic simulation for the structural color of butterfly wings", Jul. 14, 2009, Optical Society of America, Applied Optics, vol. 48, No. 21, pp. 4177-4190.*

Eloise Van Hooijdonk, Carlos Barthou, Jean Pol Vigneron, and Serge Berthier, "Detailed experimental analysis of the structural fluorescence in the butterfly Morpho sulkowskyi (Nymphalidae)" Nov. 14, 2011, Journal of Nanophotonics, vol. 5, pp. 053525-1 to 053525-13.*

Uwe Kreibig and Michael Vollmer, "Optical Properties of Metal Clusters", 1995, Springer-Verlag, pp. 78-81 and 187-199.*

Guo, S. et al. "Rectangular Silver Nanorods: Controlled Preparation, Liquid-Liquid Interface Assembly, and Application in Surface-Enhanced Raman Scattering" Crystal Growth & Design, vol. 9, No. 1 (Nov. 26, 2008) pp. 372-377.*

Tan, B. "Nanorod Solar Cell" Master of Engineering in Material Science and Engineering at the Massachusetts Institute of Technology Sep. 24, 2007, pp. 40-42.*

Oh, J. R., "Effects of symmetry, shape, and structural parameters of two-dimensional SiNx photonic crystal on the extracted light from Y2O3:Eu3+ film" Journal of Applied Physics, vol. 105, (Feb. 18, 2009) pp. 043103-1 to 043103-9.*

Haase et al., Thin-Film Silicon Solar Cells with Efficient Periodic Light Trapping Texture, Applied Physics Letters, vol. 91, issue 6 (2007), 3 pages.

McPheeters et al., Improved Performance of In(Ga)As/GaAs Quantum Dot Solar Cells Via Light Scattering by Nanoparticles, Jourtnal of Applied Physics, vol. 106, issue 5 (2009), 1 page abstract.

Pillai et al., Surface Plasmon Enhanced Silicon Solar Cells, Journal of Applied Physics, vol. 101, issue 9 (2007), 3 pages.

Pryce et al., Plasmonic Nanoparticle Enhanced Photocurrent in GaN/InGaN/GaN Quantum Well Solar Cells, Applied Physics Letters, vol. 96, issue 15 (2010), 3 pages.

* cited by examiner

APPARATUSES AND DEVICES FOR ABSORBING ELECTROMAGNETIC RADIATION, AND METHODS OF FORMING THE APPARATUSES AND DEVICES

TECHNICAL FIELD

Embodiments of the present disclosure relate to optical devices and, more particularly, to photonic nanostructures and other optically sensitive devices, and to methods for forming such devices.

BACKGROUND

Many systems currently employ light absorbing devices in photodetection and imaging. Conventional light absorbing devices generally include structures, such as quantum dots, gratings, and clusters, which are configured to excite (e.g., absorb) electrons in response to a particular wavelength of incident electromagnetic radiation (hereinafter "radiation"). Conventional light absorbing devices generally only absorb a narrow bandwidth of radiation. In general, the structures may resonantly enhance the local surface electromagnetic field (i.e., $|E(w)^2|$) from the dipolar enhancement effect for incident radiation. The structures of conventional light absorbing devices generally have three dimensions (x, y, z) that may all be varied in order to tune the structure to a desired excitation wavelength. The excitation wavelength may increase as the dimensions of the structures increase. Each dimension of the structures may have its own associated excitation wavelength. As a result, when more than one dimension is varied, there may be an interaction among excitation wavelengths from the different dimensions, which may cause interference for determining the overall excitation wavelength of the material. The interference may result in relatively large dimensions being needed for the three dimensions of the device structures in order to obtain a relatively long excitation wavelength. The relatively large dimensions may cause interference in the excitations in the multiple dimensions, which interference may limit the range of excitation wavelengths, as well as reduce the strength of the excitations.

The inventors have appreciated that there is a need for improved light absorbing devices, including photonic nanostructures, which may decrease interference in the excitations, improve the range of the excitation wavelengths, increase the strength of the excitations, and improve efficiencies of devices that may employ such light absorbing devices, among other benefits.

BRIEF DESCRIPTION OF THE DRAWINGS

In the drawings, which illustrate embodiments of the disclosure.

DETAILED DESCRIPTION

Figure 1A:
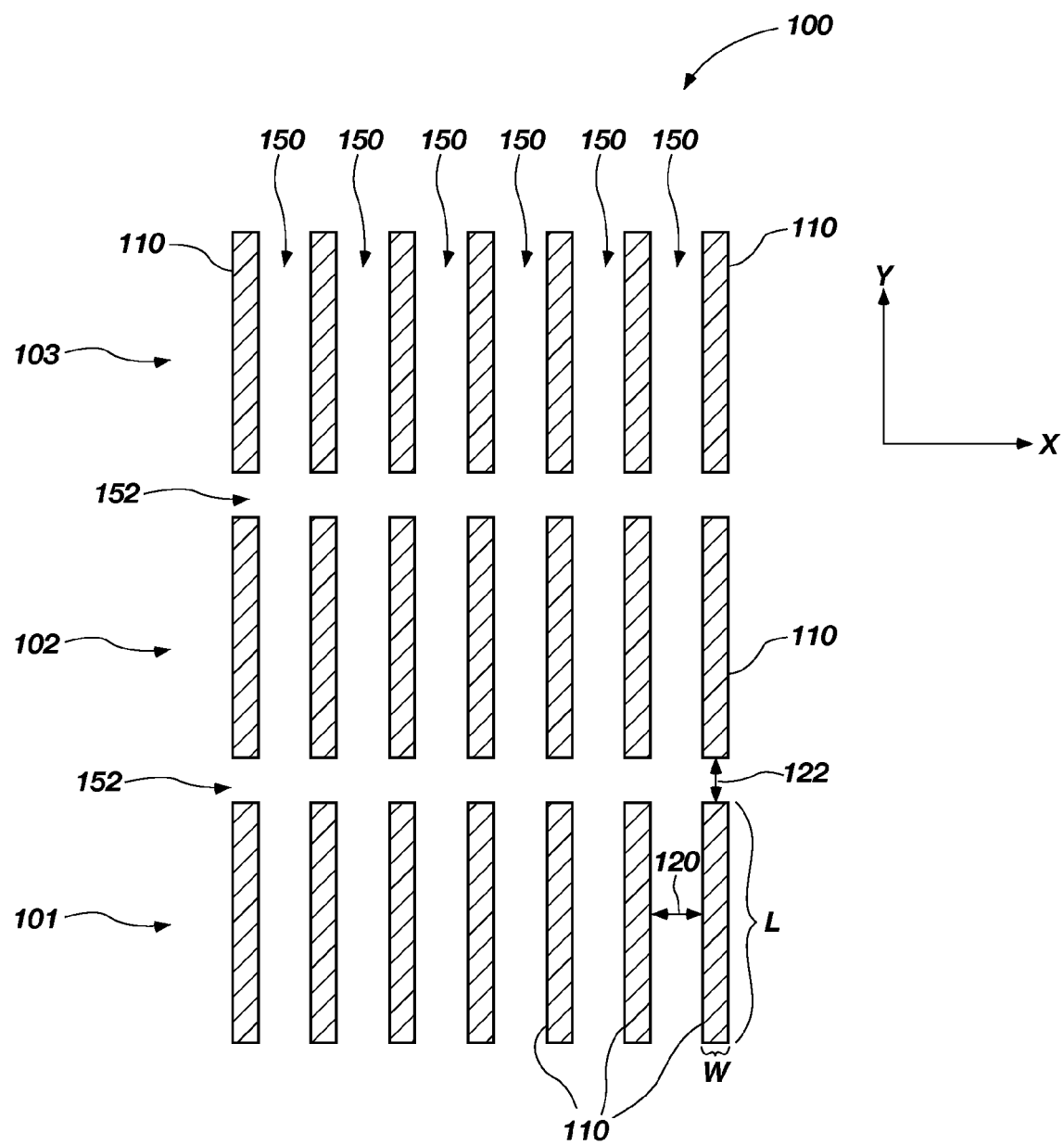
FIG. 1A is a top view of a photonic nanostructure according to an embodiment of the present disclosure.

Light absorbing devices, such as a photonic nanostructure, are disclosed. A photonic nanostructure may include a plurality of photonic nanobars including a plurality of dimensions. By selectively varying a first dimension of the photonic nanobars while maintaining a second dimension and a third dimension of the photonic nanobars as sufficiently small, such that the dipolar enhancement effects from the second dimension and the third dimension are substantially outside a desired wavelength range, the photonic nanostructure may be configured (e.g., tuned) to provide enhanced radiation absorption or to absorb radiation within the desired wavelength range. For example, the desired wavelength range for radiation absorption may approximate the visible wavelength spectrum. The resulting photonic nanostructure may be more efficient than conventional light absorbing devices.

In the following detailed description, reference is made to the accompanying drawings which form a part hereof, and in which is shown by way of illustration specific embodiments in which the disclosure may be practiced. These embodiments are described in sufficient detail to enable those of ordinary skill in the art to practice the disclosure, and it is to be understood that other embodiments may be utilized, and that structural, logical, and electrical changes may be made within the scope of the present disclosure.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise a set of elements may comprise one or more elements.

The terms "wafer" and "substrate" are to be understood as a semiconductor-based material including silicon, silicon-on-insulator (SOI) or silicon-on-sapphire (SOS) technology, doped and undoped silicon, doped and undoped semiconductors, epitaxial layers of silicon supported by a base semiconductor foundation, and other semiconductor structures. Furthermore, when reference is made to a "wafer" or "substrate" in the following description, previous process acts may have been utilized to form regions or junctions in or over the base semiconductor structure or foundation. In addition, the semiconductor need not be silicon-based, but may be based on silicon-germanium, silicon-on-insulator, silicon-on-sapphire, germanium, or gallium arsenide, among others.

The term "excitation wavelength" refers to the wavelength of incident radiation (e.g., visible light) that may transfer energy to (i.e., excite) a light-reactive chemical group of a material sufficient for an electron in the material to move up to a different electron energy level. The excitation wavelength may also be referred to herein as an "absorption wavelength" as the incident radiation may be thought of as being absorbed by a material at a given wavelength in order to accomplish the energy transfer. The excitation wavelength may depend, at least in part, on the material being excited, and on the configuration (e.g., dimensions) of the material.

FIG. 1A is a top view of a photonic nanostructure 100 according to an embodiment of the present disclosure. The photonic nanostructure 100 includes a plurality of photonic nanobars 110. The plurality of photonic nanobars 110 may be arranged as an array. For example, the photonic nanostructure 100 may be arranged in rows 101, 102, 103 of photonic nanobars 110 of the plurality. It is noted that, for clarity, not all photonic nanobars 110 of the plurality are labeled with reference numerals in FIG. 1.

Figure 1B:
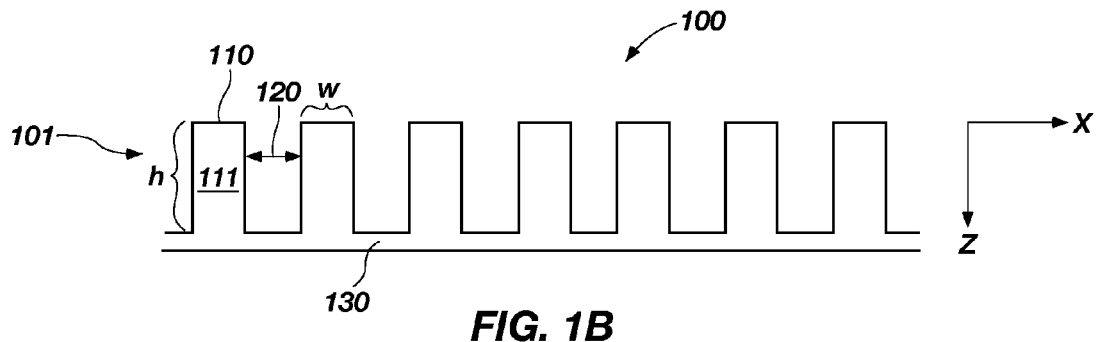
FIG. 1B is a side view of a photonic nanostructure according to an embodiment of the present disclosure.

An individual photonic nanobar 110 of the plurality may have three dimensions: a width (w), a length (L), and a height (h). As oriented in FIG. 1A, the width (w) is in the X-direction and the length (L) is in the Y-direction. The height (h) is in the Z-direction, which extends into FIG. 1A, but is not illustrated in FIG. 1A. It is noted that the height (h) and the Z-direction are shown in FIG. 1B. Each of the width (w) and the height (h) may be significantly smaller than the length (L) to ensure minimal interference in radiation absorption. By way of example, the width (w) and the height (h) may be less than approximately 41 nm, such as less than approximately 20 nm, so that the width (w) and the height (h) absorb radiation in the ultraviolet wavelength spectrum.

The relatively small dimensions of the width (w) and the height (h) may reduce red shift interactions in addition to maximizing the excitation wavelength response. An individual photonic nanobar 110 of the plurality may be separated from an adjacent photonic nanobar 110 within the same row (e.g., row 101) by a distance 120. An individual photonic nanobar 110 of the plurality may be separated from an adjacent photonic nanobar 110 of a different, adjacent row (e.g., row 102) by a distance 122. Because of the separation of the photonic nanobars 110 from each other, the photonic nanobars 110 may be referred to as "islands." The density of the plurality of photonic nanobars 110 within the photonic nanostructure 100 may be increased by reducing distance 120, distance 122, or both. By increasing the density of the photonic nanobars 110, the amplitude of the excitation wavelength may be increased.

The length (L) may be chosen to absorb a desired wavelength. For example, if two photonic nanostructures 100 having relatively small widths (w) and heights (h) as relative to the length (L), and if the lengths (L) of the two photonic nanostructures 100 are substantially different, the excitation wavelength of the two photonic nanostructures 100 may be different. By way of example, in a first photonic nanostructure 100, the width (w) and height (h) of the photonic nanobars 110 may each be approximately 20 nm or less and the length (L) may be approximately 41 nm. In a second photonic nanostructure 100, the width (w) and height (h) of the photonic nanobars 110 may each be approximately 20 nm or less, and the length (L) may be approximately 133 nm. The excitation wavelength for the first photonic nanostructure 100 may be approximately 400 nm while the excitation wavelength for the second photonic nanostructure 100 may be approximately 800 nm. Therefore, an approximately 440 nm wavelength response may be achieved per 100 nm change in the length (L). By adjusting the length (L), photonic nanostructures 100 having different excitation wavelengths may be achieved. It is noted that the photonic nanobars 110 shown in FIG. 1A have lengths (L) that are approximately equal to one another. Examples of photonic nanobars having variable lengths are shown in FIGS. 3A-3D.

Because the materials and dimensions of the individual photonic nanobars 110 of the plurality are approximately the same in FIG. 1A, each photonic nanobar 110 of the plurality has approximately the same excitation wavelength. As a result, the photonic nanostructure 100 of FIG. 1A may have a single dominant excitation wavelength. In order to absorb radiation at other excitation wavelengths or across a range of excitation wavelengths, the dimensions of the photonic nanobar 110 may be changed. As previously discussed, conventional structures may vary in multiple dimensions. However, other embodiments of the present disclosure (e.g., FIGS. 3A-3D) may include photonic nanobars with two of the dimensions (e.g., width (w) and height (h)) being substantially identical (i.e., fixed), and another dimension (e.g., length (L)) being varied in order to tailor the excitation wavelengths to be within a desired range of excitation wavelengths. The photonic nanobars having variable lengths may be arranged in arrays or other patterns (e.g., FIGS. 3A-3D).

The plurality of photonic nanobars 110 may be formed from a material, such as a semiconductive material (e.g., silicon, silicon oxide, indium tin oxide (ITO), etc.), a dielectric material, a conductive material (e.g., metal, metal-alloy, etc.), or a combination of one or more of a semiconductive, a dielectric material, and a conductive material. For example, the photonic nanobars 110 may be formed from a single material (a first material only), such as one of a semiconductive, a dielectric material, a conductive material, or a material that includes a combination of semiconductive, dielectric, and conductive materials. The plurality of photonic nanobars 110 may be formed from a plurality of discrete materials. For example, the plurality of photonic nanobars 110 may be formed from a first material (e.g., a semiconductive material) with a second material (e.g., a conductive film) disposed thereon. By way of example, the photonic nanobars 110 may be formed from silicon and may, optionally, have a tungsten material formed thereover. Alternatively, the photonic nanobars 110 may be formed from a metal or a metal alloy, and may, optionally, have a tungsten material formed thereover.

In particular, the plurality of photonic nanobars 110 may be produced by forming trenches 150, 152 in a bulk material (e.g., first material). As shown in FIG. 1A, trenches 150 may be formed in a vertical direction, and trenches 152 may be fowled in a horizontal direction. Forming the trenches 150, 152 may include one or more of photo masking processes, etching processes, electron beam lithography processes, nano-imprint processes, or other conventional semiconductor fabrication processes known in the art.

It should be apparent that forming trenches 150, 152 may be performed in any order. For example, the trenches 150 may be foamed in the vertical direction to form relatively long strips of the bulk material having a width (w). The relatively long strips of the bulk material may then be formed into the plurality of photonic nanobars 110 having a length (L) by forming the trenches 152 in the horizontal direction. Alternatively, the trenches 152 may be formed in the horizontal direction to form groups of the bulk material having a length (L). The groups of bulk material may then be formed into the plurality of photonic nanobars 110 having a width (w) by forming trenches 150 in the vertical direction.

FIG. 1B is a side view of a photonic nanostructure 100 according to an embodiment of the present disclosure. For example, the side view of the photonic nanostructure 100 may represent an individual row 101 of the plurality of photonic nanobars 110 of FIG. 1A. Individual photonic nanobars 110 may have a height (h) in the Z-direction. Therefore, the three dimensions of the photonic nanobars 110 includes their height (h), width (w), and length (L), which are shown in FIGS. 1A and 1B.

The plurality of photonic nanobars 110 may be formed from a first material 111. The first material 111 may include, but is not limited to, silicon, silicon-germanium, silicon-on-insulator, silicon-on-sapphire, germanium, gallium arsenide, or carbon, among other similar materials. The first material 111 may also (or in the alternative) include a metal or a metal alloy. For example, the first material 111 may include tungsten, nickel, steel, aluminum, aluminum alloys, noble metals, noble metal alloys, near-noble metals, near-noble metal alloys, silver, or silver alloys, as well as other similar materials.

The plurality of photonic nanobars 110 may be formed onto a substrate 130. For example, the plurality of photonic nanobars 110 may be patterned, embedded, or otherwise formed on the substrate 130. The substrate 130 may be framed from the same material as the first material 111 such that the plurality of photonic nanobars 110 are patterned protrusions of the substrate 130. The substrate 130 may, alternatively, be a different material than the first material 111 from which the plurality of photonic nanobars 110 are formed. For example, the substrate 130 may be a transparent material, such as a material layer, upon which the plurality of photonic nanobars 110 are formed. The transparent material may include, for example, ITO, an oxide, borophosphosilicate glass (BPSG), a silicon on insulator material, or other transparent materials. The substrate 130 may include a non-transparent material. The first material 111 may be formed on the substrate 130 by any suitable technique including, but not limited to, spin coating, blanket coating, chemical vapor deposition (CVD), atomic layer deposition (ALD), plasma enhanced ALD, or physical vapor deposition (PVD), unless otherwise specified. Alternatively, the first material 111 may be grown in situ. Depending on the specific material to be formed, the technique for depositing or growing the first material 111 may be selected by a person of ordinary skill in the art.

Figure 1C:
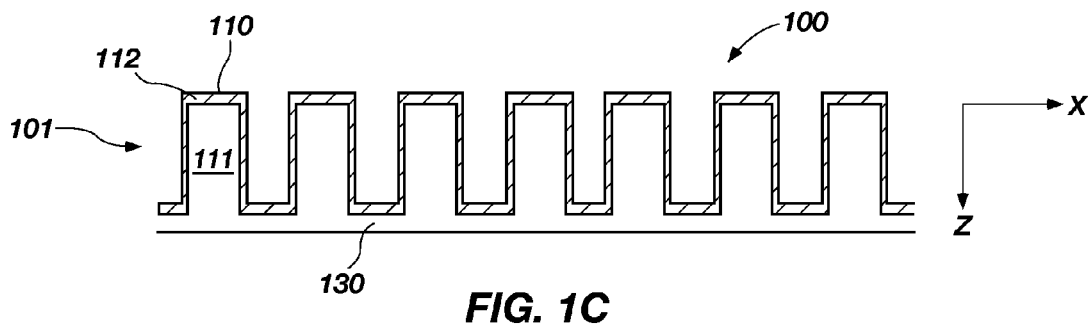
FIG. 1C is a side view of the photonic nanostructure according to an embodiment of the present disclosure.

FIG. 1C is a side view of the photonic nanostructure 100 according to another embodiment of the present disclosure. For example, the side view of the photonic nanostructure 100 may represent an individual row 101 of the plurality of photonic nanobars 110 similar to that of FIG. 1A except that the plurality of photonic nanobars 110 may include a first material 111 and a second material 112. The first material 111 may be formed into the photonic nanobars 110 as described above with respect to FIG. 1B. The second material 112 may be formed over the first material 111. Therefore, the photonic nanostructure 100 of FIG. 1C may be considered to be a result of a subsequent processing act in comparison to the embodiment shown in FIG. 1B. However, it is noted that some embodiments of the present disclosure may include the first material 111 without a subsequent second material 112 disposed thereon. Therefore, the plurality of photonic nanobars 110 including a first material 111 should not be construed to require a second material 112 unless specifically described or recited as requiring such.

The second material 112 may include a material with greater conductive properties than the first material 111, which may improve the charge response of the photonic nanobars 110 in response to the incident radiation. In addition to being conductive, the second material 112 may also be patternable. The second material 112 may be a conductive material, such as a metal or a metal alloy. By way of example, the metal may be a transition metal having free electrons, such as tungsten or silver. In one embodiment, the first material 111 is silicon and the second material 112 is tungsten. However, the metal may also be steel or other conductive materials used in semiconductor fabrication. The second material 112 may be formed over the first material 111 at a relatively thin thickness. For example, the thickness of the second material 112 may be approximately 60 Å or less. In some embodiments the thickness of the second material 112 may be as thin as 20 Å or less. By forming the second material 112 over the first material 111, the light absorption by the photonic nanostructure 100 may be enhanced.

The second material 112 may be formed on the first material 111 prior to dividing the first material 111 into the plurality of photonic nanobars 110. As an example, relatively long strips of the first material 111 may be formed, after which the second material 112 may be formed thereon. The relatively long strips of the first material 111 having the second material 112 formed thereon may be divided into the plurality of photonic nanobars 110. Depending on the material used, the second material 112 may be formed by any suitable technique including, but not limited to, spin coating, blanket coating, CVD, ALD, plasma enhanced ALD, or PVD, unless otherwise specified. Alternatively, the materials may be grown in situ.

Alternatively, the second material 112 may be formed on the first material 111 after dividing the first material 111 into the plurality of photonic nanobars 110. As an example, relatively long strips of the first material 111 may be formed, after which the relatively long strips of the first material 111 may be divided into the plurality of photonic nanobars 110. After the first material 111 is divided into photonic nanobars 110 of, the second material 112 may be formed on the first material 111.

If a conductive material is employed for one of the first material 111 or the second material 112, the absorption response of the photonic nanostructure 100 may be improved in comparison to an embodiment in which no conductive material is employed. Additionally, the conductive material may improve the polarized reflectance measurements of the photonic nanostructure 100. The polarized reflectance measurements may be improved for both TM mode polarization (i.e., polarization of incident radiation is vertical to the L direction) and TE mode polarization (i.e., polarization of incident radiation is parallel to the L direction).

Figure 2:
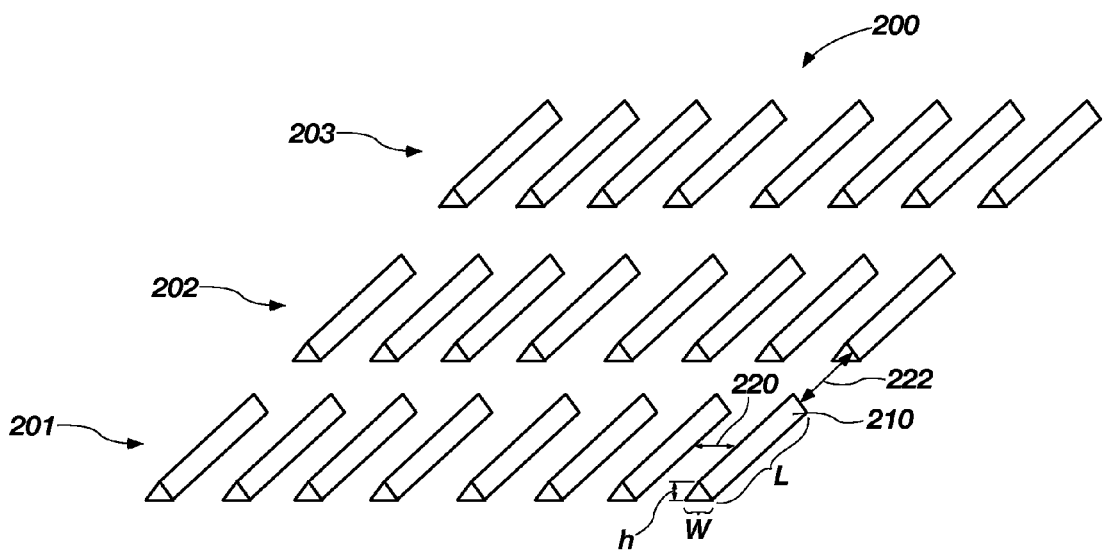
FIG. 2 is a perspective view of a photonic nanostructure according to another embodiment of the present disclosure.

FIG. 2 is a perspective view of a photonic nanostructure 200 according to another embodiment of the present disclosure. The photonic nanostructure 200 includes photonic nanobars 210 that are arranged in rows 201, 202, 203. The photonic nanobars 210 may be separated from adjacent photonic nanobars 210 by distances 220, 222. The photonic nanobars 210 are configured to absorb incident radiation at an excitation wavelength that is related to or corresponds to the dimensions of the photonic nanobars 210. In particular, the width (w) and the height (h) of the photonic nanobars 210 may be sized to be substantially smaller than the length (L). In addition, the length (L) of the photonic nanobars 210 may be varied in order to tailor (i.e., tune) the excitation wavelengths to be within a predetermined range. The width (w) and the height (h) may be sufficiently small, such that the dipolar enhancement effects that are contributed by the width (w) and the height (h) are substantially outside of the predetermined range. It is noted that the photonic nanobars 210 shown in FIG. 2 have lengths (L) that are approximately equal to one another. Examples of photonic nanobars having variable lengths are shown in FIGS. 3A-3D.

The photonic nanobars 210 of FIG. 2 are further configured in a triangular cross-sectional shape as opposed to the rectangular cross-sectional shape shown in FIGS. 1A through 1C. The triangular shape of the photonic nanobars 210 may provide lateral scattering of the incident radiation in addition to the absorption of the incident radiation at the excitation wavelength. For example, such lateral scattering of the incident radiation may be desired when the photonic nanostructure 210 is employed in a solar cell (see e.g., FIGS. 6A and 6B). Other shapes and configurations of photonic nanobars 110, 210 are contemplated in addition to the rectangular and triangular shapes illustrated herein.

FIGS. 3A-3D illustrate photonic nanostructures 300A-300D including photonic nanobars 310 of variable lengths (L) that are arranged in different patterns according to embodiments of the present disclosure. The photonic nanostructures 300A-300D include photonic nanobars 310 that may be formed as previously described with reference to FIGS. 1A-1C. For example, the photonic nanobars 310 may be formed of a first material, which may include a semiconductive material (e.g., silicon), a dielectric material, a conductive material (e.g., a metal, a metal alloy), or a combination of one or more of a semiconductive material, a dielectric material, and a conductive material. The photonic nanobars 310 may further include a second material disposed on the first material, as previously described with reference to FIG. 1C. For example, the second material may be formed of a thin metal film or a metal alloy, which is formed on the first material.

The variable dimensions of the photonic nanobars 310 may result in a range of excitation wavelengths for the photonic nanostructures 300A-300D. In particular, two of the dimensions (e.g., width (w) and height (h)) of the photonic nanobars 310 may be fixed in that the widths (w) of each of the photonic nanobars 310 may be substantially identical to one another while the heights (h) of each of the photonic nanobars 310 may be substantially identical to one another. In other words, the widths (w) may be substantially identical with the other widths (w) for each of the photonic nanobars 310, and the heights (h) may be substantially identical with the other heights (h) for each of the photonic nanobars 310. The widths (w) and the heights (h) may optionally be approximately equal to each other. Another of the dimensions (e.g., length (L)) of the photonic nanobars 310 may be varied throughout the photonic nanostructures 300A-300D. The difference in length (L) of the photonic nanobars 310 may enable the photonic nanostructures 300A-300D to absorb radiation across a range of excitation wavelengths rather than only at a single excitation wavelength. In other words, the photonic nanobars 310 may be formed at different lengths (L) while each of the width (w) and the height (h) are at least substantially identical between the individual photonic nanobars 310. By selecting the dimensions width (w) and height (h) to be smaller relative to the smallest length of the lengths (L) of the photonic nanobars 310, interference associated with each dimension may be reduced. For example, the width (w) and the height (h) may each be relatively small in comparison with the smallest length (L) such that the dipolar enhancement effects that are contributed by the width (w) and the height (h) are substantially outside of the desired range, reducing interference from the width (w) and the height (h) at wavelengths within a desired excitation wavelength range. As a result, the photonic nanobars 310 may be varied in a quasi-one dimensional manner according to their length (L) in order to achieve an enhanced radiation wavelength response within the desired excitation wavelength range.

The desired (i.e., predetermined) excitation wavelength range may be the visible light spectrum (i.e., from approximately 400 nm to approximately 800 nm). Of course, other desired excitation wavelength ranges are contemplated, which may include wavelengths that are outside of the visible light spectrum, or which may include ranges that are narrower or wider than the visible light spectrum.

As previously discussed, a light absorbing structure may resonantly enhance the local surface electromagnetic field (i.e., $|E(w)^2|$) from the dipolar enhancement effect for incident radiation. Conventional structures may vary two or more dimensions of the structure to obtain a range of excitation wavelengths, which may result in interference in the excitation wavelengths of the different dimensions. Such interference may result in relatively large structures in three dimensions with limited excitation wavelength ranges. In contrast, with the photonic nanostructures of the present disclosure, such as the photonic nanostructures 300A-300D, the excitation wavelength range may be determined by varying a single dimension (e.g., length (L)) of the photonic nanobars 310, while the other dimensions (e.g., width (w), height (h)) are sufficiently small such that they have a substantially reduced interference upon the wavelength response within the excitation wavelength ranges for the single dimension (e.g., length (L)). As a result, varying the photonic nanobars 310 of the photonic nanostructures 300A-300D in a single dimension (e.g., length (L)) throughout the photonic nanostructures 300A-300D may increase the range of the excitation wavelengths with relatively small changes in the variable single dimension, which may further result in relatively smaller photonic nanobars 310, increased strength of the excitations, and more flexible and wider ranges of excitation wavelengths. The variations in a quasi single dimension (e.g., length (L)) may result in a wider excitation wavelength range than conventional structures.

Figure 3A:
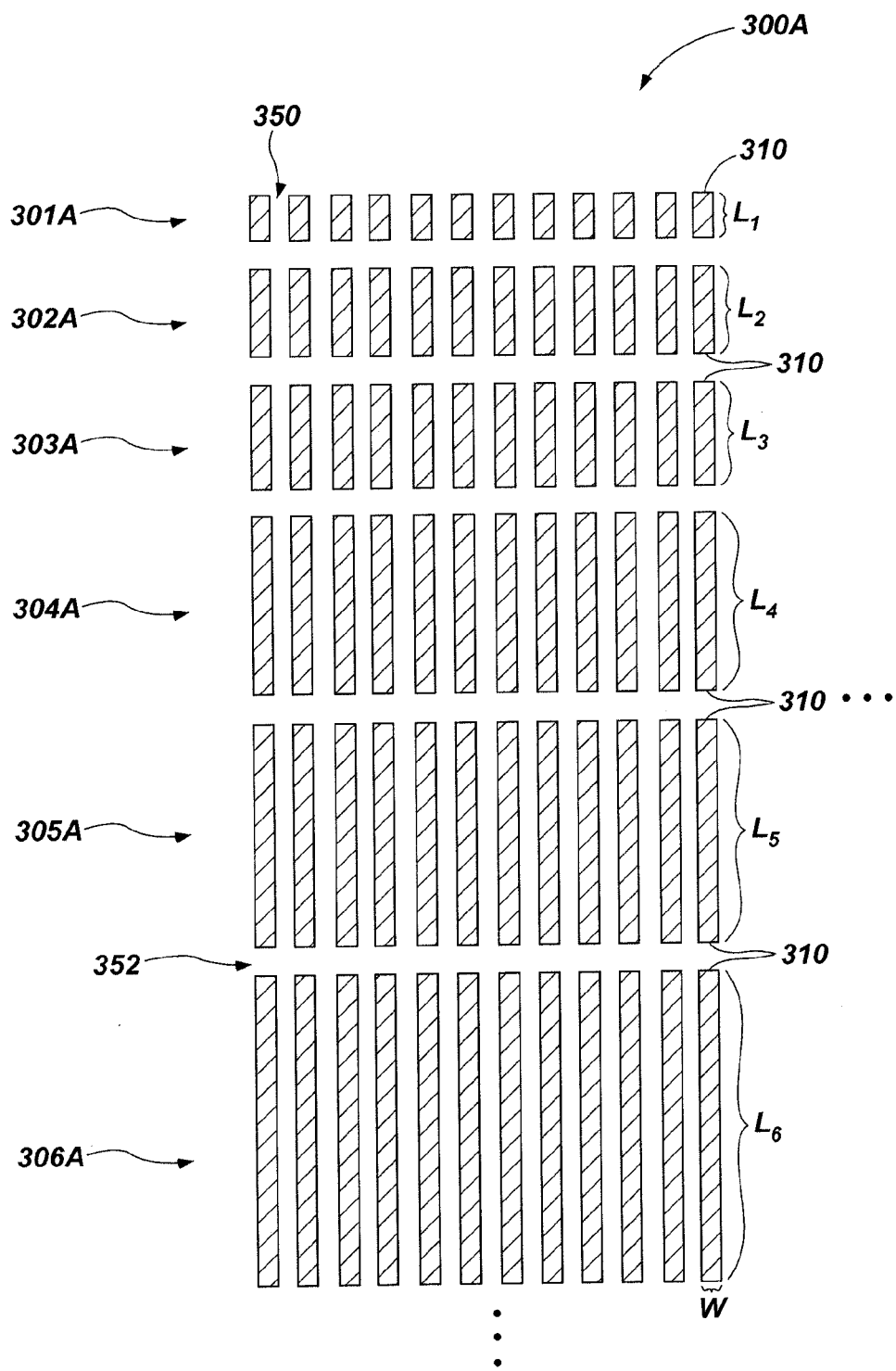
FIGS. 3A-3D illustrate photonic nanostructures including photonic nanobars of variable lengths that are arranged in different patterns according to embodiments of the present disclosure.

FIG. 3A illustrates a photonic nanostructure 300A that is arranged as an array and is configured as a plurality of rows 301A-306A of photonic nanobars 310. Such an array may be a sub-array for a larger array (not shown). For example, the array of the photonic nanostructure 300A may repeat itself to form a relatively larger photonic nanostructure 300A. As a result, an entire surface area of an object (e.g., a device) may be covered with repeat units of the photonic nanostructures 300A, which is indicated schematically in FIG. 3A by ellipses.

In order to form the photonic nanostructure 300A, a plurality of trenches 350, 352 may be formed in the bulk material (e.g., first material) such that the photonic nanobars 310 protrude from the surface of the bulk material in which they are formed. As previously described, the trenches 350, 352 may include vertical trenches 350 and horizontal trenches 352.

Each row 301A-306A of the photonic nanostructure 300A may include photonic nanobars 310 with variable lengths ($L_1$-$L_6$). In other words, the photonic nanobars 310 in row 301A may have a first length ($L_1$), the photonic nanobars 310 in row 302A may have a second length ($L_2$), the photonic nanobars 310 in row 303A may have a third length ($L_3$), and so on. The other dimensions (i.e., width (w) and height (h)) of the photonic nanobars 310 may be fixed. In other words, the widths (w) and the heights (h) of the photonic nanobars 310 in one row may be approximately equal to the respective widths (w) and heights (h) of the photonic nanobars 310 in the other rows. In some embodiments, the width (w) and the height (h) are also approximately equal to each other. Because the widths (w) and the heights (h) are fixed, the only dimension that may be changed is the length ($L_1$-$L_6$) in order to tune the photonic nanostructure 300A to absorb incident radiation at across a range of excitation wavelengths.

As an example, each of the width (w) and height (h) of the photonic nanobars 310 may be approximately 20 nm or less. The first length ($L_1$) for the first row 301A of photonic nanobars 310 may be approximately 41 nm. The sixth length ($L_6$) for the sixth row 306A of photonic nanobars 310 may be approximately 133 nm. The second length ($L_2$) through the fifth length ($L_5$) may be lengths that are increased incrementally between 41 nm and 133 nm. Utilizing those approximate dimensions for the lengths ($L_1$-$L_6$) of the photonic nanobars 310, the range for the excitation wavelengths of the photonic nanostructure 300A may be between 400 nm and 800 nm, which is approximately equal to the range of the visible light spectrum.

While specific dimensions are described that may result in the excitation wavelength range that is approximately equal to the visible light spectrum, these dimensions are intended as examples. Actual dimensions that result in an excitation wavelength range that resembles the visible light spectrum may depend, in part, on multiple factors such as the material used in forming the photonic nanostructure 300A. Specific dimensions are also given for the fixed dimensions of the width (w) and height (h), which should be viewed as examples and not as being limited by this description. For example, the fixed dimensions of one or both of the width (w) and the height (h) may be as low as single atoms in some embodiments.

It should also be noted that while FIG. 3A illustrates a photonic nanostructure 300A with six different lengths ($L_1$-$L_6$) of photonic nanobars 310, photonic nanostructures with more or fewer different lengths are also contemplated. For example, more lengths may be generated by having smaller increments (i.e., more gradual differences) between the lengths of the photonic nanobars 310 in adjacent rows. Having more intermediate lengths may further improve the resolution of the excitation wavelength range, and improve the number of excitation wavelengths and the amount of incident radiation that is absorbed by the photonic nanostructure.

It should also be noted that the width (w) and the height (h) may not be equal for the different lengths ($L_1$-$L_6$), and may not be uniform across a sub-array or a larger array. The sizing of the width (w) and the height (h) may be sufficiently smaller than the relative size of the length (L) such that the dipolar enhancement effects that are contributed by the width (w) and the height (h) are substantially outside of the desired excitation wavelength range determined, in large part, by varying the length (L).

Figure 3B:
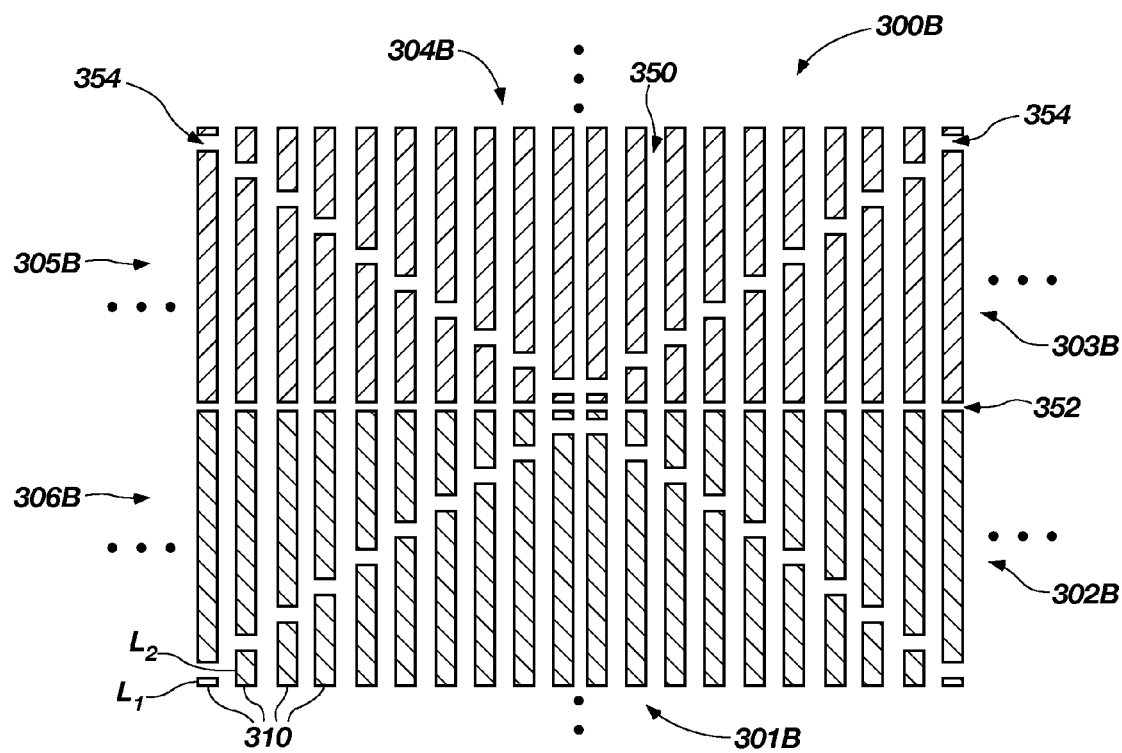

FIG. 3B illustrates a photonic nanostructure 300B that is arranged as an array of triangles 301B-306B of photonic nanobars 310 of variable lengths (e.g., lengths $L_1$, $L_2$, and so on). It is noted that not all photonic nanobars 310 are labeled with the reference numeral 310. Such an array of triangles 301B-306B may be a sub-array for a larger array (not shown). For example, the array of the photonic nanostructure 300B may repeat itself to form a relatively larger photonic nanostructure 300B, as indicated by ellipses. As a result, an entire surface area of an object (e.g., a device) may be covered with repeat units of photonic nanostructures 300B. By selecting the lengths $L_1$, $L_2$, etc., of each of the photonic nanobars 310 to be between approximately 41 nm and 133 nm, the photonic nanostructures 300B may have a range of excitation wavelengths. The range for the excitation wavelengths of the photonic nanostructure 300B may be between 400 nm and 800 nm, which spans the range of the visible light spectrum.

In order to form the photonic nanostructure 300B, a plurality of trenches 350, 352, 354 may be formed in the bulk material (e.g., first material) such that the photonic nanobars 310 protrude from the surface of the bulk material in which they are formed. Trenches 350, 352, 354 may include vertical trenches 350, horizontal trenches 352, and angular trenches 354. The number of different lengths of the photonic nanobars 310, including the incremental changes between adjacent photonic nanobars 310, may be determined by the acuteness of the oblique angle selected when forming the angular trenches 354.

Figure 3C:
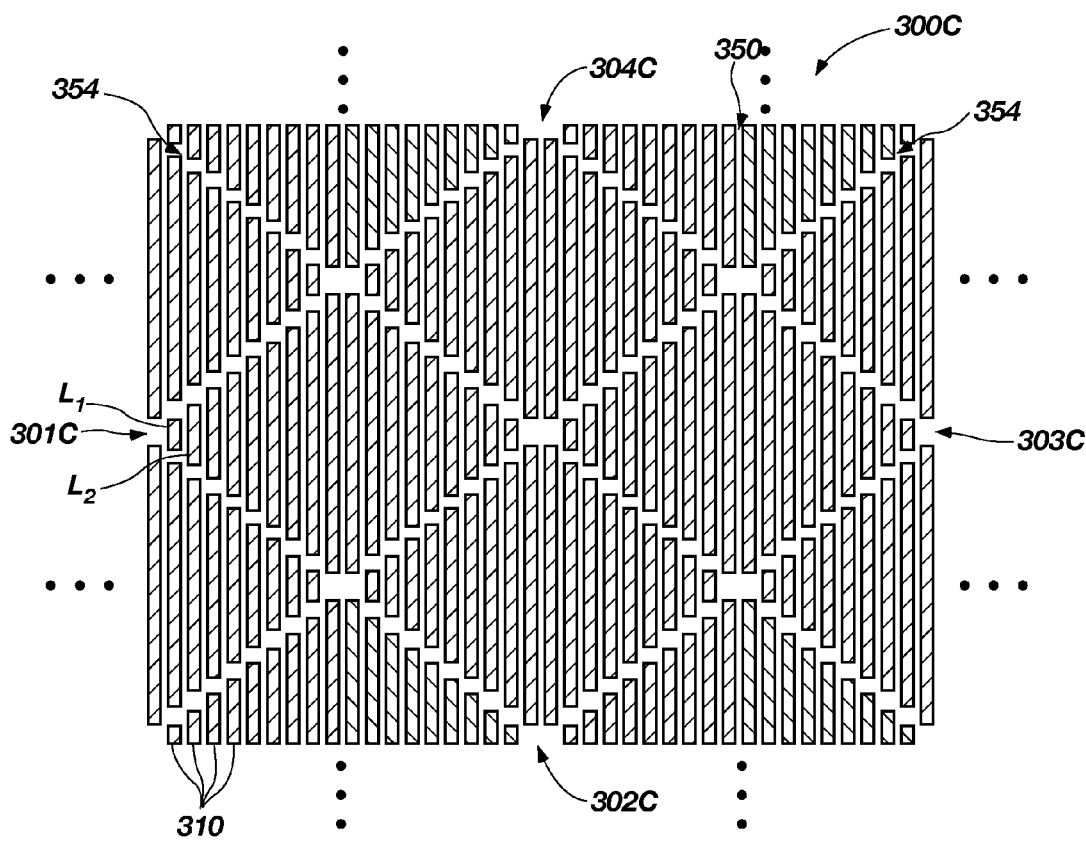

FIG. 3C illustrates a photonic nanostructure 300C that is arranged as an array of diamonds 301C-304C of photonic nanobars 310 of variable lengths (e.g., lengths $L_1$, $L_2$, and so on). It is noted that not all photonic nanobars 310 are labeled with the reference numeral 310. It is further noted that not all diamonds of the array of diamonds are labeled with a reference numeral. For example, the periphery of the array includes partial diamond shapes, which may further extend to form a full diamond (not shown).

Such an array of diamonds 301C-304C may be a sub-array for a larger array (not shown). For example, the array of the photonic nanostructure 300C may repeat itself to form a relatively larger photonic nanostructure 300C, as indicated by ellipses. As a result, an entire surface area of an object (e.g., a device) may be covered with repeat units of photonic nanostructures 300C. By selecting the lengths $L_1$, $L_2$, etc., of each of the photonic nanobars 310 to be between approximately 41 nm and 133 nm, the photonic nanostructures 300C may have multiple excitation wavelengths. The range for the excitation wavelengths of the photonic nanostructure 300C may be between 400 nm and 800 nm, which spans the range of the visible light spectrum.

In order to form the photonic nanostructure 300C, a plurality of trenches 350, 354 may be formed in the bulk material (e.g., first material) such that the photonic nanobars 310 protrude from the surface of the bulk material in which they are formed. Trenches 350, 354 may include vertical trenches 350 and angular trenches 354. The number of different lengths of the photonic nanobars 310, including the incremental changes between adjacent photonic nanobars 310, may be determined by the acuteness of the oblique angle selected when forming the angular trenches 354. It is noted that there are no horizontal trenches farmed in the photonic nanostructure 300C in FIG. 3C.

Figure 3D:
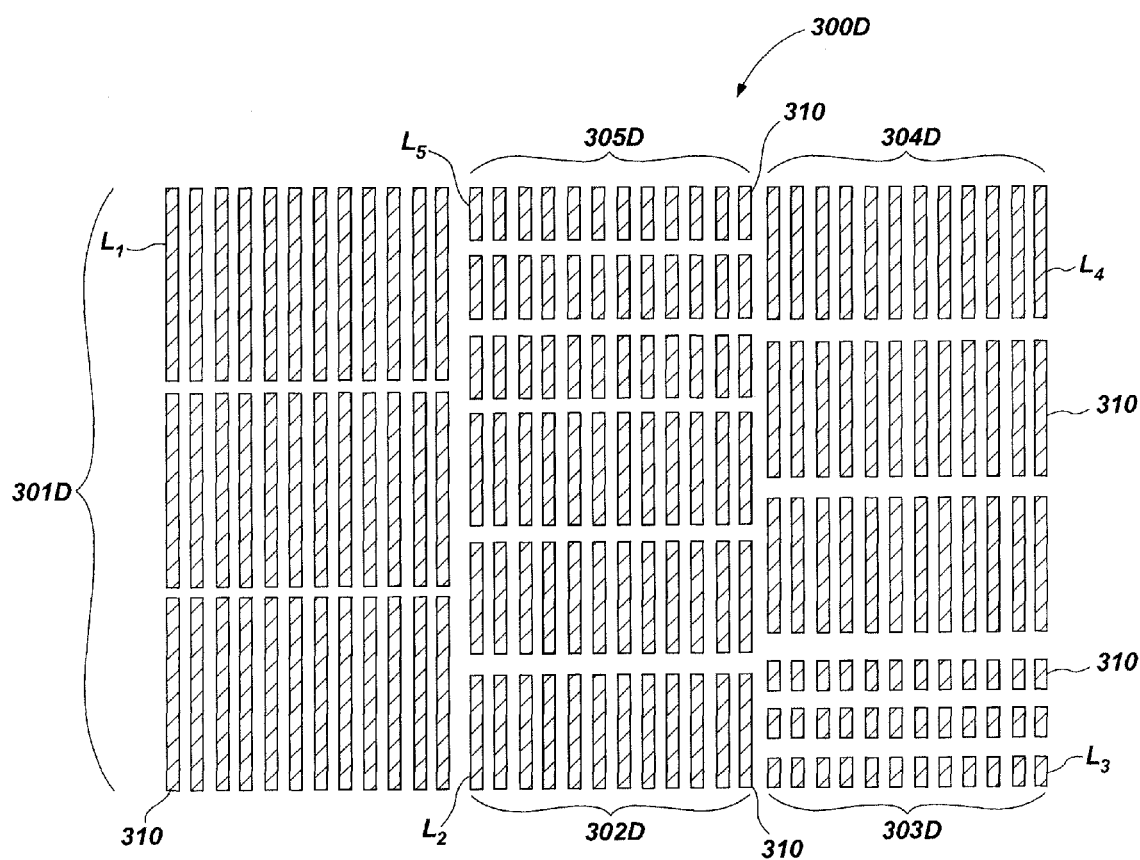

FIG. 3D illustrates a photonic nanostructure 300D that is arranged as an array of groups 301D-305D of photonic nanobars 310 of variable lengths (e.g., lengths $L_1$, $L_2$, and so on). It is noted that not all photonic nanobars 310 are labeled with the reference numeral 310. Such an array of groups 301D-305D may be a sub-array for a larger array (not shown). For example, the array of the photonic nanostructure 300D may repeat itself to form a relatively larger photonic nanostructure 300D. As a result, an entire surface area of an object (e.g., device) may be covered with repeat units of photonic nanostructures 300D.

The array patterns for the nanostructures 300A-300D shown in FIGS. 3A-3D are shown as examples, and are not limiting. Other patterns having different lengths of photonic nanobars 310 are also contemplated to be embodiments of the present disclosure, including patterns that may appear randomized. It is noted that some patterns may be easier to manufacture, such as by conventional semiconductor fabrication processes, than others. In some embodiments, the photonic nanobars 310 may be concave structures rather than the convex (i.e., protruding) structures described above and illustrated herein.

Figure 4:
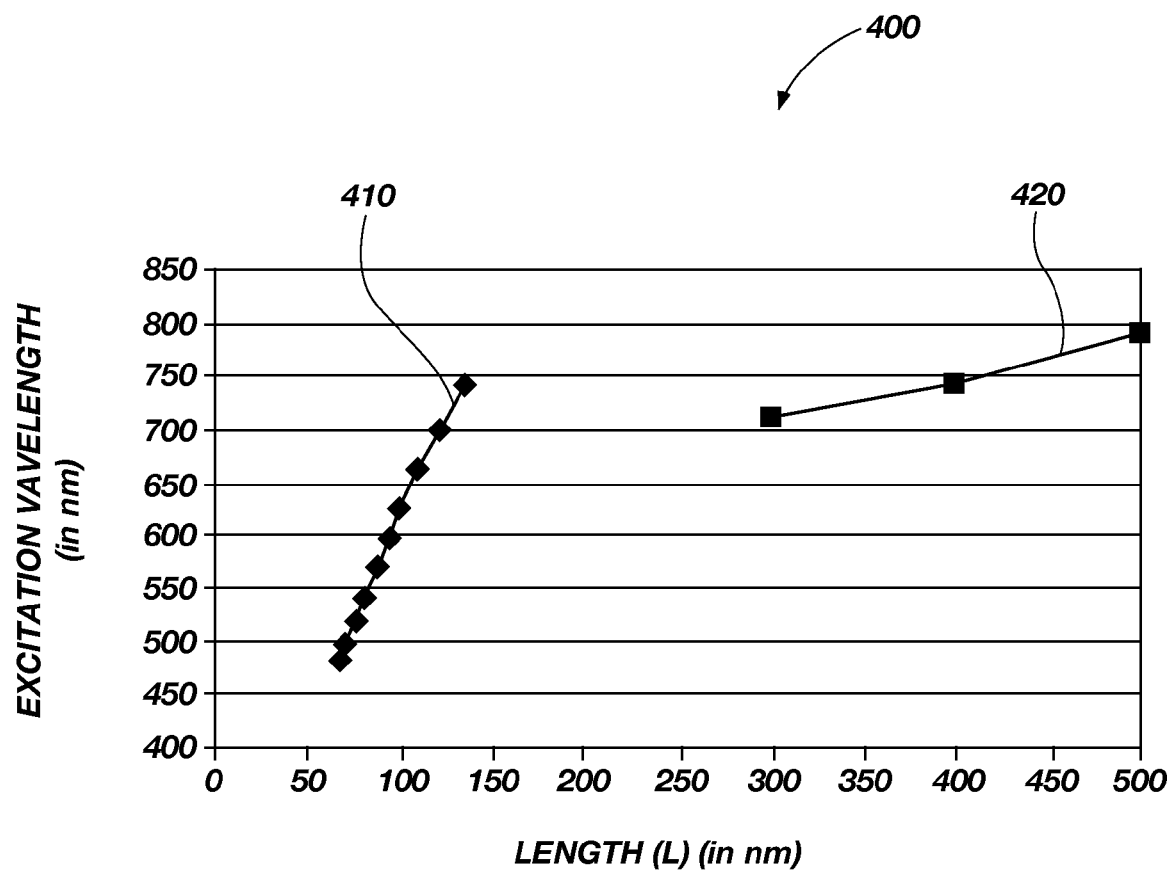
FIG. 4 is a graph illustrating how the length of a photonic nanobar according to embodiments of the present disclosure may influence the excitation wavelength as compared with the length of a conventional structure.

FIG. 4 is a graph 400 illustrating how the length of a photonic nanobar according to embodiments of the present disclosure may influence the excitation wavelength as compared with the length of nano-dots or gratings of a conventional structure. For example, line 410 represents the length (L) of a photonic nanostructure including photonic nanobars with variable lengths as a function of their respective excitation wavelengths. The photonic nanobars are configured as described herein with different lengths while maintaining widths and heights that are at least substantially identical between individual photonic nanobars of the plurality. Line 420 represents a conventional structure with the longest dimension length (L) and the respective excitation wavelengths. Conventional structures may include sub-wavelength size nano-dots and gratings that vary in multiple dimensions across the conventional structure.

As evidenced by line 420 of FIG. 4, the nano-dots or gratings in the conventional structure may have a length (L) that varies (along with other dimensions) from 300 nm to 500 nm in order to achieve an excitation wavelength range from approximately 700 nm to 800 nm. In other words, a 200 nm range for the length (L) in a conventional structure may result in a 100 nm excitation wavelength range. As evidenced by line 410 of FIG. 4, photonic nanobars of the present disclosure may have lengths (L) that vary in a single dimension from approximately 50 nm to approximately 150 nm to achieve a excitation wavelength range from approximately 475 nm to approximately 750 nm. In other words, a 100 nm range for the length (L) may result in a 275 nm range of the excitation wavelength. As evidenced by the graph 400 of FIG. 4, an excitation wavelength spectrum that corresponds to the entire visible light spectrum may be achieved with a relatively smaller change in length (L) in comparison with the conventional structures. Furthermore, the shorter wavelengths in the visible light spectrum may be covered by the photonic nanobars of the present disclosure, whereas conventional structures are more limited in their possible excitation wavelength range, which may be caused by a significantly larger red shift experienced in the conventional structures. The improved results shown in graph 400, may be effectuated by the quasi one dimensional variations in the dimensions of the photonic nanostructures, in which two dimensions are substantially small relative to a variable-length third dimension.

Figure 5A:
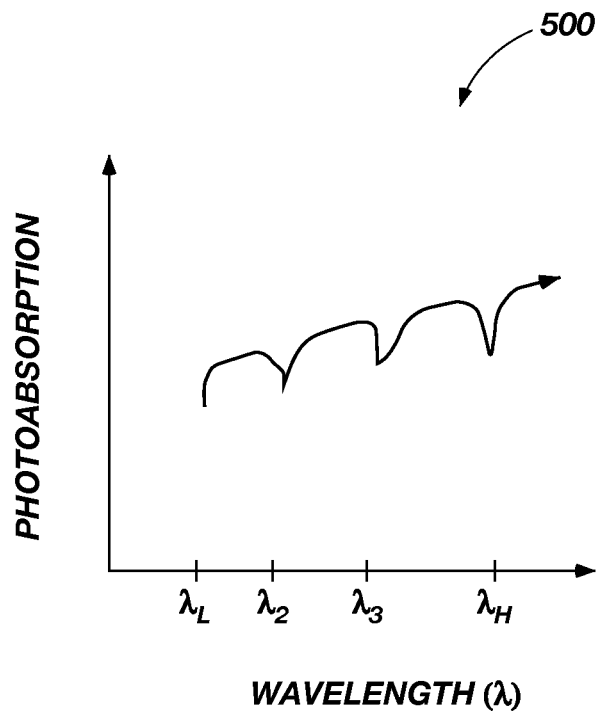
FIG. 5A is a graph illustrating the wavelength absorption of a photonic nanostructure according to an embodiment of the present disclosure.

FIG. 5A is a graph 500 illustrating the wavelength absorption of a photonic nanostructure according to an embodiment of the present disclosure. The photonic nanostructure includes photonic nanobars having variable lengths (L) according to the embodiments of the present disclosure described herein. Each length (L) may be in a single dimension that contributes to the excitation wavelength for each photonic nanobar within the photonic nanostructure. The lengths (L) of the photonic nanobars may vary throughout the photonic nanostructure while maintaining consistency of the relatively smaller heights (h) and widths (w) of the photonic nanobars.

The variable lengths of the photonic nanobars contribute to the excitation wavelength range ($\lambda_L$ to $\lambda_H$) of the photonic nanostructure. For example, a photonic nanobar with a first length has a first excitation frequency ($\lambda_L$). A photonic nanobar with a second length has a second excitation frequency ($\lambda_2$). A photonic nanobar with a third length has a third excitation frequency ($\lambda_3$). A photonic nanobar with a fourth length has a fourth excitation frequency ($\lambda_H$). In operation, when incident radiation enters the photonic nanostructure, the radiation with wavelengths that match the excitation wavelengths ($\lambda_L, \lambda_2, \lambda_3, \lambda_H$) is absorbed. Other wavelengths within the excitation wavelength range may not be absorbed if a photonic nanobar has not been tuned to that particular wavelength.

Figure 5B:
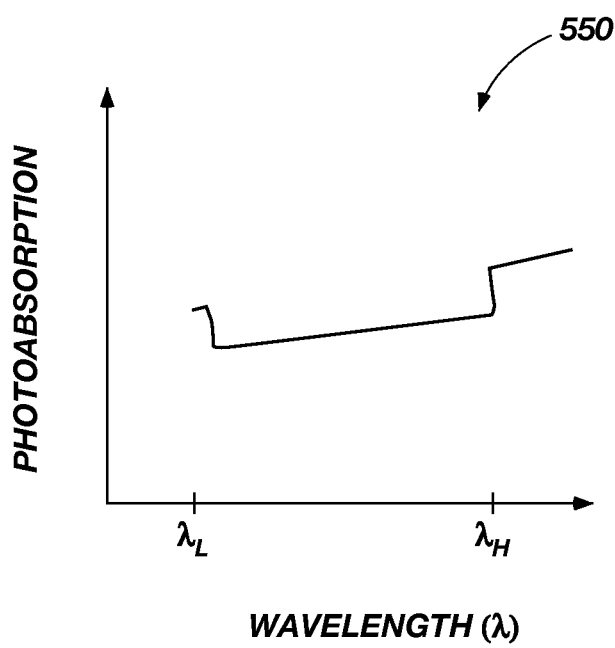
FIG. 5B is a graph illustrating the wavelength absorption of a photonic nanostructure according to an embodiment of the present disclosure.

FIG. 5B is a graph 550 illustrating the wavelength absorption of a photonic nanostructure according to an embodiment of the present disclosure. As the photonic nanostructure includes more photonic nanobars with more variable lengths, more radiation is absorbed at more intermediate excitation wavelengths within the excitation wavelength range ($\lambda_L$ to $\lambda_H$). As a result, the photoabsorption of the photonic nanostructure approaches an ideal absorption of all wavelengths within the desired excitation wavelength range ($\lambda_L$ to $\lambda_H$) as is shown in FIG. 5B.

Figure 6A:
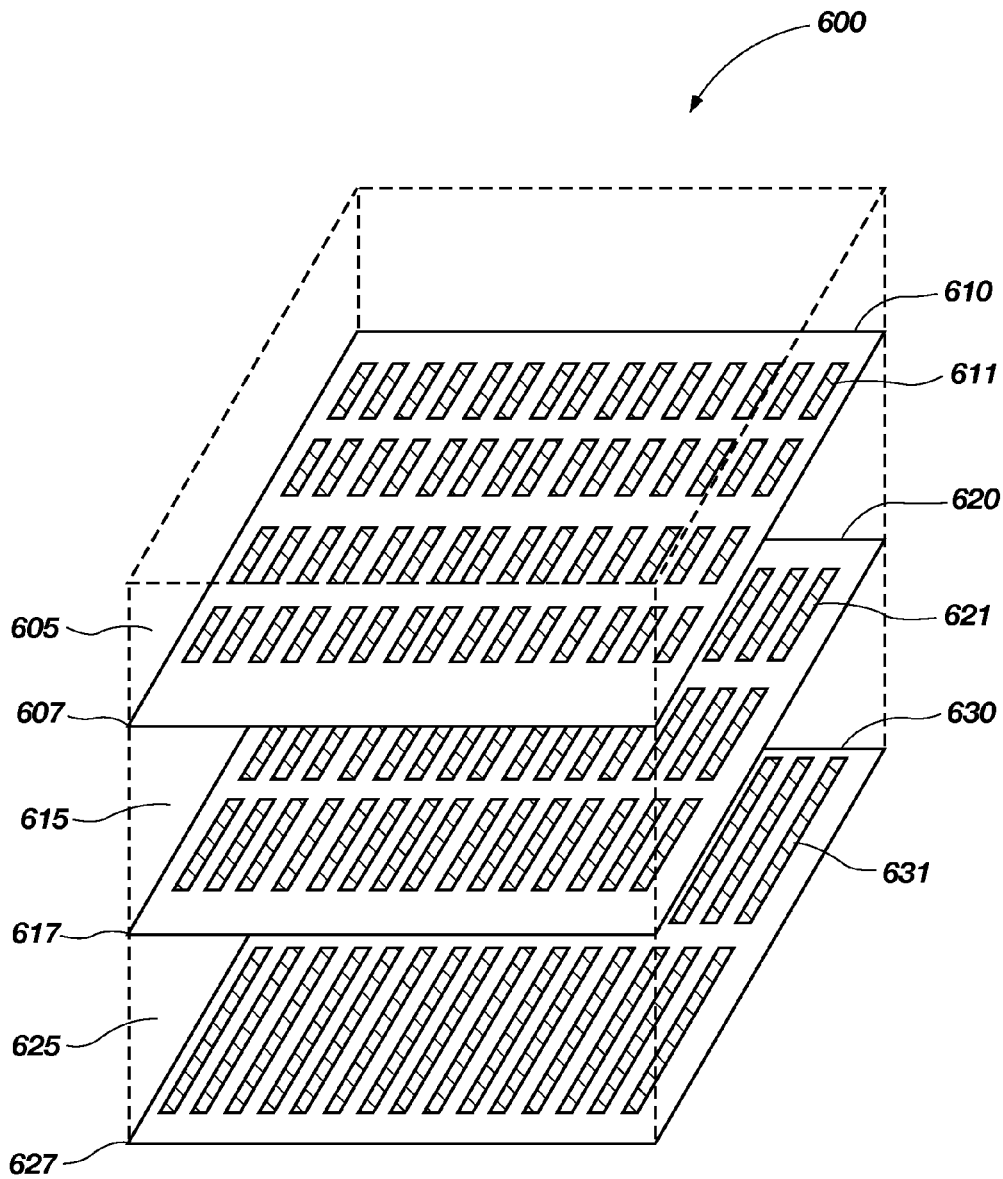
FIG. 6A is a schematic representation of a solar cell according to an embodiment of the present disclosure.

FIG. 6A is a schematic representation of a solar cell 600 according to an embodiment of the present disclosure. The solar cell 600 may be a heterojunction solar cell in that the solar cell 600 includes a plurality of semiconductor materials 605, 615, 625 that have different energy band gaps. The solar cell 600 may include a plurality of photonic nanostructures 610, 620, 630, which are similar to the embodiments of the photonic nanostructures previously described. The individual photonic nanostructures 610, 620, 630 of the plurality may be located at junctions 607, 617, 627 (i.e., an "interface") between neighboring semiconductor materials of the plurality of semiconductor materials 605, 615, 625. It is noted, that there may be one or more semiconductor materials (not shown) positioned below interface 627, and in some embodiments, semiconductor material 605 may be a transparent material (e.g., a coating). Each of the individual photonic nanostructures 610, 620, 630 may be formed as a separate structure that is embedded within the solar cell 600, or as a pattern formed on the plurality of semiconductor materials 605, 615, 625.

The individual photonic nanostructures 610, 620, 630 may be formed in a manner and of a structure similar to the other embodiments of the photonic nanostructures previously described. Each photonic nanostructure 610, 620, 630 of the plurality may include photonic nanobars 611, 621, 631, respectively. The photonic nanobars 611, 621, 631 are configured to absorb light at different excitation wavelengths by having different lengths (L). For example, the width dimension (not labeled in FIG. 6A) of the photonic nanobars 611, 621, 631 may be approximately equal for each of the different photonic nanostructures 610, 620, 630. In addition, the height dimension (not labeled in FIG. 6A) of the photonic nanobars 611, 621, 631 may be approximately equal for each of the different photonic nanostructures 610, 620, 630. The length dimension (not labeled in FIG. 6A), however, may vary for each of the photonic nanobars 611, 621, 631 of the different photonic nanostructures 610, 620, 630, similar to the different lengths of the photonic nanobars 310 shown in FIG. 3A. As shown in FIG. 6A, the lengths of the photonic nanobars 611 may be shorter than the lengths of the photonic nanobars 621, which may be shorter than the lengths of the photonic nanobars 631. As a result, the wavelength of the incident radiation absorbed by the photonic nanostructures 610, 620, and 630 may increase from smallest to largest. By varying the lengths (L) of the photonic nanostructures 610, 620, and 630, the lateral scattering of radiation through the solar cell 600 may be increased and the absorption at different energy band gap wavelengths may be increased.

The lengths of the photonic nanobars 611, 621, 631 may be configured to tailor (i.e., tune) the excitation wavelengths of the photonic nanostructures 610, 620, 630 to absorb incident radiation within a desired excitation wavelength range (e.g., visible light spectrum). Additionally, the tuned excitation wavelength for each of the photonic nanostructures 610, 620, 630 may be tuned to match the energy band gap for the associated semiconductive material 605, 615, 625 of the solar cell 600. For example, the band gap energy of each semiconductive material 605, 615, 625 is defined by:

$$E = n/\lambda \qquad (1)$$

where "E" is the band gap energy for the semiconductive material, "n" is the index of the semiconductive material, and "λ" is the wavelength of the light emitted by the semiconductor. The index of the semiconductor (n) is also known as Planck's constant (h) multiplied by the speed of light (c).

Therefore, the length of each photonic nanobar 611, 621, 631 may be tailored (i.e., tuned) such that the excitation wavelength of the photonic nanobar 611, 621, 631 may match the wavelength (λ) for the band gap energy (E) for the respective semiconductive material 605, 615, 625 of the solar cell 600. As an example, the semiconductive material gallium arsenide (GaAs) has a band gap energy known to be approximately 1.4 eV. Thus, the light emitted from GaAs has a wavelength of approximately 886 nm. As a result, if one of the semiconductive materials (e.g., semiconductive material 615) were formed from GaAs, then the corresponding photonic nanostructure (e.g., photonic nanostructure 620) may be configured to have photonic nanobars (e.g., photonic nanobars 621) having dimensions that cause the photonic nanobars (e.g., photonic nanobars 621) to have an excitation wavelength that is approximately equal to the band gap wavelength, which is 886 nm in this example.

In a heterojunction solar cell, the semiconductive material 605 with the greatest band gap energy (E) may be positioned at the outer most surface relative to the incident radiation. As a result, band gap energy (E) for the semiconductive material 605 may be relatively greater than the band gap energy (E) for the semiconductive material 615, which may be relatively greater than the band gap energy (E) for the semiconductive material 625. As a result, if the excitation wavelengths for the photonic nanostructures 610, 620, 630 are tuned to be approximately the wavelength emitted by the respective semiconductive materials 605, 615, 625, the lengths of the photonic nanobars 611, 621, 631 in photonic nanostructures 610, 620, 630 may increase accordingly in order to absorb incident radiation at the appropriate excitation wavelengths for the different semiconductive materials 605, 615, 625 within the solar cell 600. While the solar cell 600 is illustrated as a heterojunction solar cell, any solar cell may include photonic nanostructures as described herein. For example, solar cells with a single semiconductor material may also include photonic nanostructures configured as described herein.

Figure 6B:
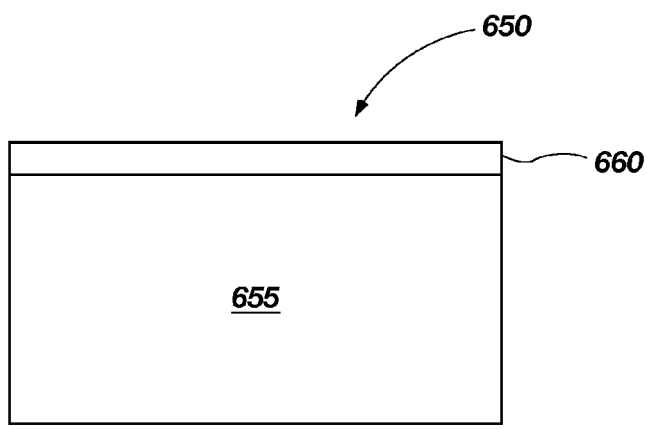
FIG. 6B is a schematic representation of a solar cell according to an embodiment of the present disclosure.

FIG. 6B is a schematic representation of a solar cell 650 according to an embodiment of the present disclosure. The solar cell 650 may include a semiconductive material 655 with a photonic nanostructure 660 formed thereon. The photonic nanostructure 660 may be configured to have a negative index property in order to absorb wavelengths over a wavelength range (e.g., solar light spectrum) according to the various configurations and orientations of photonic nanostructures including photonic nanobars that are described herein.

Figure 7:
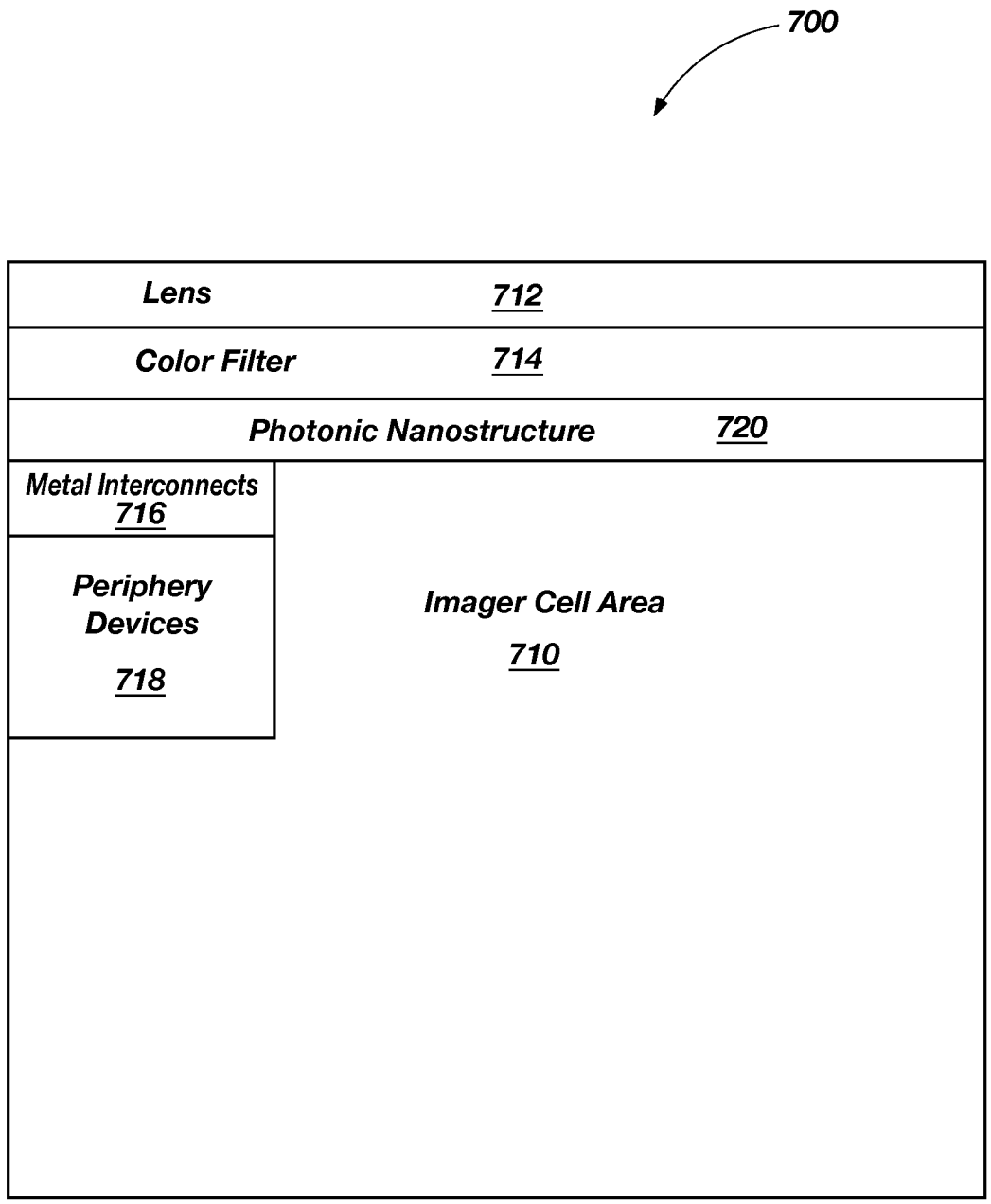
FIG. 7 is an image sensor according to an embodiment of the present disclosure.

The embodiments of the photonic nanostructures described above may also be used in additional optical devices, such as in an image sensor. FIG. 7 is an image sensor 700 according to an embodiment of the present disclosure. The image sensor 700 may include an imager cell area 710, a lens 712, a color filter 714, metal interconnects 716, and periphery devices 718. These components of the image sensor 700 may be conventional. Therefore, for simplicity, further detail of the imager cell area 710, the lens 712, the color filter 714, the metal interconnects 716, and the periphery devices 718 are omitted. However, operation and other detail of such components should be apparent to those skilled in the art. The image sensor 700 may be a CMOS image sensor, a charged coupled device (CCD), or other image sensor known in the art.

The image sensor 700 further includes a photonic nanostructure 720 coupled with the imager cell area 710. The photonic nanostructure 720 may be located between the lens 712 and the imager cell area 710. In particular, the photonic nanostructure 720 may be located below the lens 712 and the color filter 714, such that incident radiation that passes therethrough may be collected and focused by lens 712, filtered by the color filter 714, and absorbed by the photonic nanostructure 720 in order to be directed toward the imager cell area 710. By way of example, the photonic nanostructure 720 may absorb and direct visible light to the imager cell area 710.

The photonic nanostructure 720 may be configured to have a negative index property to absorb light. The photonic nanostructure 720 may further be tuned to absorb light at a predetermined wavelength, or a predetermined set (i.e., range) of wavelengths. For example, the photonic nanostructure 720 may be configured to absorb incident radiation within an excitation wavelength range, such as within the visible light spectrum. The photonic nanostructure 720 may include a plurality of photonic nanobars that are configured as described previously in regard to FIGS. 1-3D. Therefore, tailoring (i.e., tuning) the photonic nanostructure 720 to absorb incident radiation at a predetermined wavelength, or a predetermined range of wavelengths, may include varying the lengths (L) of the photonic nanobars (not shown in FIG. 7) in the photonic nanostructure 720 while fixing the other dimensions (width (w) or height (h)) of the photonic nanobars to be relatively small in comparison with the variable lengths (L) of the photonic nanobars. Increasing the absorption for the wavelengths within the visible light spectrum may improve the performance and efficiency of the image sensor 700.

Figure 8:
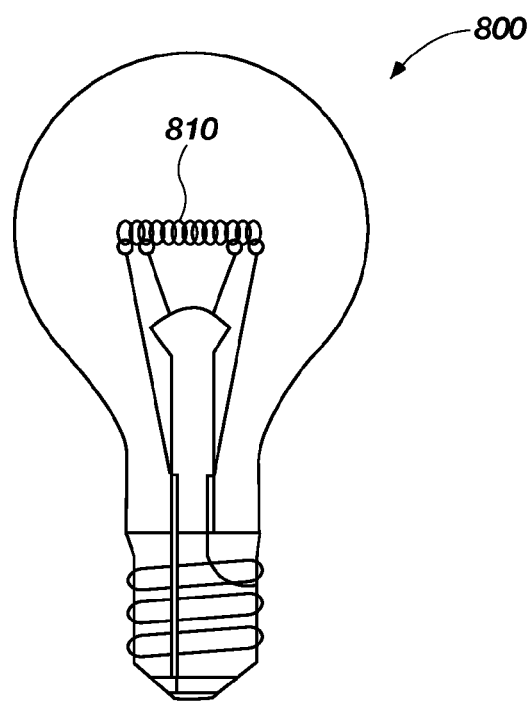
FIG. 8 illustrates a light bulb including a filament according to an embodiment of the present disclosure.

The photonic nanostructures described above may also be used to improve the efficiency of conventional light bulbs. FIG. 8 illustrates a light bulb 800 including a filament 810 according to an embodiment of the present disclosure. The light bulb 800 may be an incandescent light bulb or other light bulb that employs a filament 810. The light bulb 800 may include conventional components (e.g., glass enclosure, gas, contact wires, support wires, stem, electrical contact, etc.), the description of which are omitted for simplicity. However, the operation and other detail of such components should be apparent to those skilled in the art.

The filament 810 may include a metal wire (e.g., tungsten). The filament 810 surface may include a photonic nanostructure thereon in order to enhance total light absorption of the filament 810. In other words, the filament 810 surface may include photonic nanobars patterned thereon, with the photonic nanobars being variable in length such that the photonic nanobars are configured to absorb light at a desired range of wavelengths (e.g., across the visible light spectrum). The filament 810 surface may be patterned with photonic nanostructures similar to the photonic nanostructures previously described in regard to FIGS. 1A-3D. For example, if the view of the filament 810 were to be enlarged, the surface of the filament 810 may appear substantially identical to one of the photonic nanostructures illustrated in FIGS. 1A-3D, or other variations that are consistent with the description herein.

According to Kirchhoff's law for black body radiation, the total light emitted by the filament 810 may equal the total light absorption in a thermal equilibrium state. In other words, the closer that the filament 810 appears to be a pure black body (i.e., pure absorption of light), the more efficient the light emission of the filament 810 and the light bulb 800 may be. As a result, the photonic nanobars on the filament 810 surface may cause the filament 810 to absorb more light over a desired excitation wavelength range (e.g., visible light spectrum), which may cause the filament 810 to appear to be closer to a pure black body and convert more energy to light. As a result, the light bulb 800 with the filament 810 configured in accordance with embodiments of the present disclosure may be more efficient than conventional light bulbs.

Figure 9:
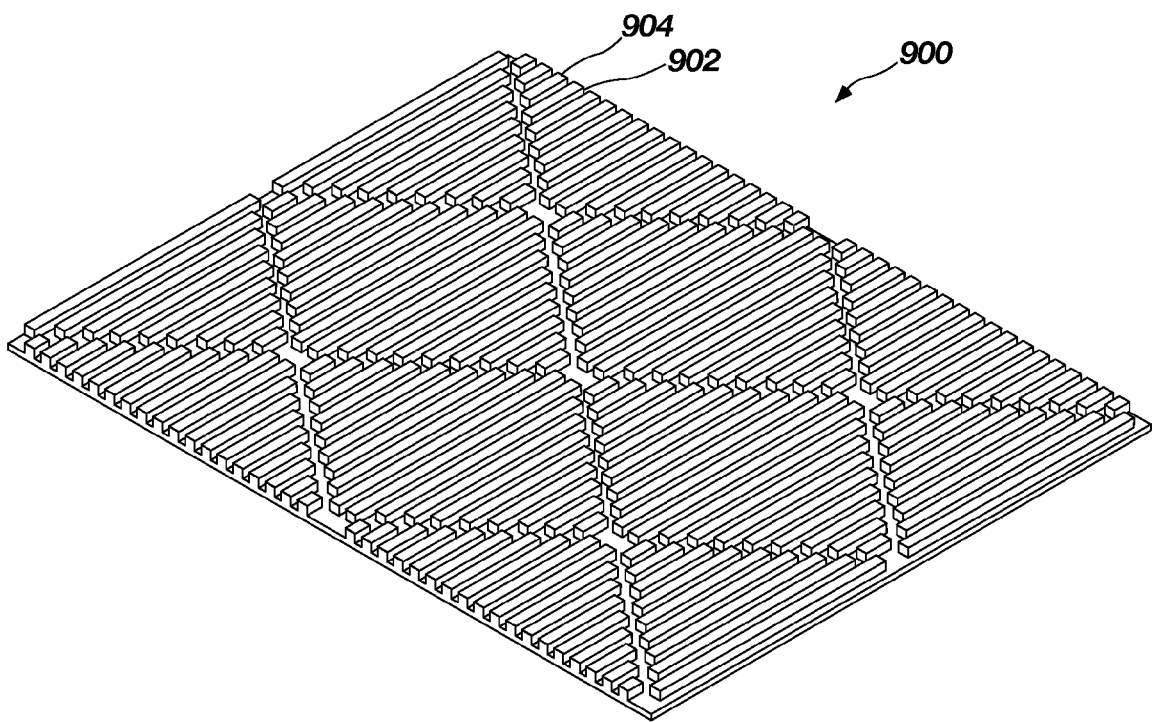
FIG. 9 is a perspective view of a stamp that may be used to form a photonic nanostructure according to an embodiment of the present disclosure.

The photonic nanostructures may be formed on the metal surface of the filament 810 by patterning a portion of bulk metal (e.g., a tungsten sheet) prior to forming (i.e., cutting) the bulk metal into individual filaments 810. The patterning of the bulk metal may be performed by forming trenches in the bulk metal such that the photonic nanobars protrude from the bulk metal. The trenches in the bulk metal may be formed as previously described herein. Another embodiment may include patterning the bulk metal with a stamp (FIG. 9). The stamp may include an inverse image of the desired pattern of the photonic nanostructures thereon. Once the bulk metal is patterned to include a plurality of photonic nanobars with variable lengths, the bulk metal may be divided into individual filaments 810 that are used in the light bulb 800.

FIG. 9 is a perspective view of a stamp 900 that may be used to form a photonic nanostructure on the light bulb 800 according to an embodiment of the present disclosure. For example, the stamp 900 may be utilized to form the photonic nanobars on the metal surface of the filament 810 (FIG. 8) that may be a component of the light bulb 800. The photonic nanobars may be formed by contacting the stamp 900 with the bulk metal. The inverse image of the pattern of photonic nanobars on the stamp 900 may be transferred to the bulk metal.

The stamp 900 may be configured as an inverse pattern for the photonic nanostructure. For example, the stamp 900 may include a plurality of trenches 902 and a plurality of protrusions 904. In operation, the stamp 900 may be depressed upon the material used for the photonic nanostructure, (i.e., the bulk material of the filament 810). The trenches 902 in the stamp 900 may form the photonic nanobars of a photonic nanostructure, while the protrusions 904 in the stamp 900 may form the spacing between adjacent photonic nanobars of the photonic nanostructure.

Some methods (e.g., photopatterning, etching, electron beam lithography, etc.) that may be used to form a photonic nanostructure may be relatively costly, in particular if the material on which the photonic nanostructure is to be formed is relatively hard (e.g., a metal). However, using the stamp 900 may be advantageous in that once the stamp 900 is created, the stamp 900 may be used numerous times to form the photonic nanostructures on the bulk metal. The stamp 900 itself may be formed by conventional techniques, which are not described in detail herein, such as photomasking processes, etching processes, electron beam lithography processes, nano-imprint processes, and other patterning processes known in the art.

Because the stamp 900 may be used more than once, the stamp 900 may be formed from a relatively hard material in order to maintain its shape and dimensional accuracy after use. For example, the stamp 900 may be formed from a material such as tungsten carbide (WC), silicon carbide (SiC), diamond-like coatings (DLC), or diamond. Other relatively hard materials may also be used to form the stamp 900. The hardness of the material used to form the stamp 900 may depend of the hardness of the material to be stamped, and upon which the photonic nanostructures are to be formed.

CONCLUSION

Embodiments of the disclosure may include photonic nanostructures, light absorbing apparatuses, devices, and methods for forming such, including use of a stamp. The photonic nanostructures may comprise a plurality of photonic nanobars configured to collectively absorb light over an excitation wavelength range. At least two of the photonic nanobars of the plurality have different lengths. Each photonic nanobar of the plurality has a substantially small width relative to the different lengths. Each photonic nanobar of the plurality has a substantially small width relative to the different lengths.

In other embodiments, a light absorbing apparatus may comprise a first material patterned into an array of photonic nanobars. The array of photonic nanobars may have a plurality of photonic nanobars comprising a plurality of different lengths and each photonic nanobar of the array has a substantially smaller width and a substantially smaller height relative to the plurality of different lengths.

A device may include a photonic nanostructure comprising a plurality of photonic nanobars that include variable lengths and widths that are smaller than a minimum length of the variable lengths. The plurality of photonic nanobars is configured to absorb light within an excitation wavelength range proportional to the variable lengths.

Embodiments of methods for forming a photonic nanostructure are disclosed. Such methods may include forming a plurality of first photonic nanobars comprising each of a width and a height that are smaller than a length of photonic nanobars of the plurality of first photonic nanobars, and forming a plurality of second photonic nanobars comprising each of a width and a height that are smaller than a length of photonic nanobars of the second plurality of photonic nanobars. The lengths of the photonic nanobars of the plurality of first photonic nanobars are different from lengths of the photonic nanobars of the plurality of second photonic nanobars.

A stamp suitable for use in forming a photonic nanostructure may comprise a surface including a plurality of protrusions and trenches therein. The plurality of protrusions and trenches may be configured as an inverse pattern for a pattern of a photonic nanostructure comprising a plurality of photonic nanobars having different lengths while maintaining a width and a height that are at least substantially identical between each photonic nanobar of the plurality.

Although the present invention has been described with reference to particular embodiments including specific sizes and configurations of photonic nanostructures and photonic nanobars, the present invention is not limited to these described embodiments. As such, the present invention is limited only by the appended claims and their legal equivalents.

What is claimed is:
1. A photonic nanostructure, comprising:
 a plurality of discrete photonic nanobars disposed on a substrate configured to collectively absorb light over an excitation wavelength range, wherein:
  each discrete photonic nanobar of the plurality of discrete photonic nanobars is separated from neighboring discrete photonic nanobars within a same row and within a different, adjacent row through trenches formed adjacent each lateral side of the discrete photonic nanobar;

at least two of the discrete photonic nanobars of the plurality have different lengths extending horizontally along the substrate;

each discrete photonic nanobar of the plurality has a substantially smaller width relative to the different lengths; and each discrete photonic nanobar of the plurality has a substantially smaller width relative to the different lengths.

2. The photonic nanostructure of claim 1, wherein the plurality of discrete photonic nanobars are configured in an array, wherein at least one row of the array includes discrete photonic nanobars of the plurality having lengths that are substantially identical to one another.

3. The photonic nanostructure of claim 1, wherein the plurality of discrete photonic nanobars are configured in an array, wherein neighboring discrete photonic nanobars of the plurality vary in length and at least some discrete photonic nanobars of the plurality are arranged in at least one of a diamond-shaped group and a triangle-shaped group in the array.

4. The photonic nanostructure of claim 1, wherein each of the width and a height of each discrete photonic nanobar of the plurality are sized to exhibit a dipolar enhancement effect that is substantially outside the excitation wavelength range.

5. The photonic nanostructure of claim 1, wherein the excitation wavelength range includes wavelengths between approximately 400 nm and approximately 800 nm.

6. The photonic nanostructure of claim 1, wherein the plurality of discrete photonic nanobars are comprised of at least one of a metal and a metal alloy selected from the group consisting of tungsten, nickel, steel aluminum, aluminum alloys, noble metals, and near-noble metals, silver, and silver alloys.

7. The photonic nanostructure of claim 6, wherein the metal comprises a metal film formed over a substrate defining shapes of discrete photonic nanobars of the plurality.

8. The photonic nanostructure of claim 1, wherein the plurality of discrete photonic nanobars are rectangular in cross-sectional shape along the lengths of the plurality of discrete photonic nanobars.

9. The photnic nanostructure of claim 1, wherein:

the at least of the discrete photonic nanobars of the plurality of discrete photonic nanobars have different lengths between approximately 41 nm and approximately 133 nm;

each discrete photonic nanobar of the plurality has a width of approximately 20 nm or less; and each discrete photonic nanobar of the plurality has a height of approximately 20 nm or less.

10. The photonic nanostructure of claim 6, wherein the metal comprises a metal film disposed on the substrate, the metal film having a thickness between approximately 20 Å and approximately 60 Å.

11. A light absorbing apparatus, comprising a first material patterned into an array of discrete photonic nanobars, disposed on a substrate, wherein:

the discrete photonic nanobars are separated from neighboring discrete photonic nanobars with a same row and within a different, adjacent row through trenches formed adjacent each lateral side of the discrete photonic nanobars; and the array of discrete photonic nanobars having a plurality of discrete photonic nanobars comprising a plurality of different lengths extending horizontally along the substrate, wherein each discrete photonic nanobar of the array has a substantially smaller width and a substantially smaller height relative to the plurality of different lengths, such that the array of discrete photonic nanobars is configured to collectively absorb radiation having a plurality of different wavelengths over an excitation wavelength range.

12. The light absorbing apparatus of claim 11, further comprising a second material disposed over the first material.

13. The light absorbing apparatus of claim 11, wherein the first material comprises a dielectric material.

14. The light absorbing apparatus of claim 12, wherein the second material comprises at least one of a metal and a metal alloy.

15. The light absorbing apparatus of claim 11, wherein the plurality of discrete photonic nanobars having widths that are substantially identical to one another and having heights that are substantially identical to one another, wherein the widths and height of each discrete plurality of photonic nanobars are substantially equal to one another.

16. The light absorbing apparatus of claim 11, wherein the plurality of different lengths of the plurality of discrete photonic nanobars are configured to enable the light absorbing apparatus to absorb radiation for a plurality of wavelengths across the visible light spectrum.

17. A device, comprising:

a photonic nanostructure comprising a plurality of discrete photonic nanobars disposed on a substrate, the plurality of discrete photonic nanobars comprising:

variable lengths extending horizontally along the substrate; and widths and heights that are smaller than a minimum length of the variable lengths, wherein:

the widths and variable lengths of neighboring discrete photonic nanobars within a same row and within a different, adjacent row are separated by trenches formed adjacent each lateral side of the discrete photonic nanobar; and the plurality of discrete photonic nanobars is configured to absorb light of a plurality of different wavelengths within an excitation wavelength range proportional to the variable lengths.

18. The device of claim 17, wherein the widths of each discrete photonic nanobar of the plurality are substantially identical.

19. The device of claim 17, wherein the device is a light bulb and the photonic nanostructure is configured as a filament of the light bulb.

20. The device of claim 17, wherein the device is an image sensor and the photonic nanostructure is configured as a light absorbing material located between a lens of the image sensor and an imager cell area.

21. The device of claim 17, wherein the device is a solar cell and the photonic nanostructure is configured to absorb light into a solar cell area of the solar cell.

22. The device of claim 21, wherein the solar cell is a heterojunction solar cell comprising a plurality of solar cell areas with different band gap energies, wherein the photonic nanostructure comprises the plurality of discrete photonic nanobars located at junctions between the plurality of solar cell areas.

23. The device of claim 21, wherein discrete photonic nanobars of the plurality are triangular in cross-sectional shape along the variable lengths and configured to laterally scatter incident radiation.

24. A method for forming a photonic nanostructure on a substrate, the method comprising: forming a plurality of first discrete photonic nanobars comprising each of a width and a height that are smaller than a length of discrete photonic nanobars of the plurality of first discrete photonic nanobars, wherein the length extends horizontally along the substrate;

forming a plurality of second discrete photonic nanobars comprising each of a width and a height that are smaller than a length of discrete photonic nanobars of the plurality of second discrete photonic nanobars, wherein the lengths of the discrete photonic nanobars of the plurality of first discrete photonic nanobars are different from the lengths of the discrete photonic nanobars of the plurality of second discrete photonic nanobars; and forming a plurality of trenches adjacent each lateral side of the neighboring discrete photnic naobars within a same row and within a different, adjacent row.

25. The method of claim 24, wherein forming the plurality of first discrete photonic nanobars and forming the plurality of second discrete photonic nanobars comprises forming the plurality of trenches in a bulk material and dividing the remaining protruding portions of the bulk material into an array of discrete photonic nanobars that comprises the plurality of first discrete photonic nanobars and the plurality of second discrete photonic nanobars.

26. The method of claim 25, wherein forming the plurality of trenches in a bulk material comprises forming the plurality of trenches in a first material and forming a second material on the first material.

27. The method of claim 26, wherein forming the second material on the second material on the first material comprises forming the second material after dividing the remaining protruding portions of the bulk material into the array of discrete photonic nanobars.

28. The method of claim 25, wherein dividing the remaining protruding portions of the bulk material into an array of discrete photonic nanobars comprises forming a second plurality of trenches in the remaining protruding portions of the bulk material by at least one of etching, electron beam lithography, photomasking, and nano-imprinting.

29. The method of claim 25, wherein dividing the remaining protruding portions of the bulk material into an array of discrete photonic nanobars comprises forming a second plurality of trenches in the remaining protruding portions of the bulk material at an oblique angle to the plurality of trenches to form the array of discrete photonic nanobars.

30. The method of claim 25, wherein dividing the remaining protruding portions of the bulk material into an array of discrete photonic nanobars comprises forming a second plurality of trenches in a direction perpendicular to the plurality of trenches to form the array of discrete photonic nanobars that are substantially equal in length across a row, and vary in length relative to neighboring rows of the array of discrete photonic nanobars.

31. The method of claim 24, wherein forming the plurality of first discrete photonic nanobars and the plurality of second discrete photonic nanobars comprises contacting a stamp onto a metal sheet, the stamp comprising an inverse pattern of trenches and protrusions that form an array of discrete photonic nanobars that includes the plurality of first discrete photonic nanobars and the plurality of second discrete photonic nanobars.

32. The method of claim 24, further comprising forming a plurality of additional discrete photonic nanobars comprising a substantially identical width as the plurality of first discrete photonic nanobars and the plurality of second discrete photonic nanobars and a substantially identical height as the plurality of first discrete photonic nanobars and the plurality of second discrete photonic nanobars.

33. The method of claim 32, wherein forming the plurality of additional discrete photonic nanobars comprises incrementally varying lengths of the plurality of additional discrete photonic nanobars between the lengths of the first discrete photonic nanobars and the second discrete photonic nanobars.

34. A stamp, comprising a surface including a plurality of protrusions and trenches therein, the plurality of protrusions and trenches configured as an inverse pattern for a pattern of a photonic nanostructure comprising a plurality of photonic nanobars having different lengths while maintaining a width and a height that are at least substantially identical between each discrete photonic nanobar of the plurality wherein the lengths of the nanobars extend horizontally along a substrate and wherein each of the width and the height of the plurality of discrete photonic nanobars is smaller than a minimum length of the different lengths of the plurality of discrete photonic nanobars.

35. The stamp of claim 34, wherein the surface comprises a material selected from the group consisting of tungsten carbide, silicon carbide, diamond, and a diamond-like coating.

* * * * *

UNITED STATES PATENT AND TRADEMARK OFFICE
CERTIFICATE OF CORRECTION

PATENT NO.        : 8,797,662 B2
APPLICATION NO.   : 12/967733
DATED             : August 5, 2014
INVENTOR(S)       : Yongjun Jeff Hu et al.

Page 1 of 1

It is certified that error appears in the above-identified patent and that said Letters Patent is hereby corrected as shown below:

In the Claims

Column 16, line 60, Claim 1, after "substrate" insert -- and --.
Column 17, line 8, Claim 1, delete "width" and insert -- height --, therefor.
Column 17, line 23, Claim 4, delete "a" and insert -- the --, therefor.
Column 17, line 32, Claim 6, delete "steel" and insert -- steel, --, therefor.
Column 17, line 36, Claim 7, delete "a" and insert -- the --, therefor.
Column 17, line 42, Claim 9, delete "photnic" and insert -- photonic --, therefor.
Column 17, line 43, Claim 9, after "least" insert -- two --.
Column 17, line 56, Claim 11, delete "nanobars," and insert -- nanobars --, therefor.
Column 17, line 59, Claim 11, delete "with" and insert -- within --, therefor.
Column 18, line 17, Claim 15, delete "height" and insert -- heights --, therefor.
Column 18, line 17, Claim 15, after "discrete" delete "plurality of".
Column 18, line 17, Claim 15, delete "nanobars" and insert -- nanobar --, therefor.
Column 19, line 14, Claim 24, delete "photnic" and insert -- photonic --, therefor.
Column 19, line 15, Claim 24, delete "naobars" and insert -- nanobars --, therefor.
Column 19, line 30, Claim 27, after "material" delete "on the second material".
Column 20, line 33, Claim 34, after "of" insert -- discrete --.

Signed and Sealed this
Fourth Day of November, 2014

Michelle K. Lee
*Deputy Director of the United States Patent and Trademark Office*